(12) United States Patent
Muráncsik et al.

(10) Patent No.: US 12,379,592 B2
(45) Date of Patent: Aug. 5, 2025

(54) SYSTEMS AND METHODS FOR DISPLAYING IMAGE ON WINDSCREEN

(71) Applicant: DYNACLOUD KFT., Budapest (HU)

(72) Inventors: György Csaba Muráncsik, Budapest (HU); Tibor Károly Kellessy, Budapest (HU); Gábor Tarnói, Budapest (HU); József Goldfárth, Budapest (HU)

( * ) Notice: Subject to any disclaimer, the term of this patent is extended or adjusted under 35 U.S.C. 154(b) by 541 days.

(21) Appl. No.: 17/630,967

(22) PCT Filed: Jul. 30, 2020

(86) PCT No.: PCT/EP2020/071553
§ 371 (c)(1),
(2) Date: Jan. 28, 2022

(87) PCT Pub. No.: WO2021/019034
PCT Pub. Date: Feb. 4, 2021

(65) Prior Publication Data
US 2022/0269073 A1    Aug. 25, 2022

(30) Foreign Application Priority Data

Jul. 30, 2019   (EP) .................................... 19462003

(51) Int. Cl.
*G02B 27/01* (2006.01)
*B60K 35/00* (2024.01)
*B60K 35/23* (2024.01)
*B60K 35/28* (2024.01)

(52) U.S. Cl.
CPC .......... *G02B 27/0101* (2013.01); *B60K 35/00* (2013.01); *B60K 35/23* (2024.01); *B60K 35/28* (2024.01); *B60K 2360/177* (2024.01); *B60K 2360/21* (2024.01); *G02B 2027/0118* (2013.01); *G02B 2027/0138* (2013.01); *G02B 2027/014* (2013.01)

(58) Field of Classification Search
CPC ........ G02B 27/0101; G02B 2027/0118; B60K 35/00; B60K 2360/27
See application file for complete search history.

(56) References Cited

U.S. PATENT DOCUMENTS

| 5,963,280 A | * | 10/1999 | Okuda | G01C 21/265 349/86 |
| 2015/0232030 A1 | * | 8/2015 | Bongwald | G02B 27/0101 348/115 |

* cited by examiner

Primary Examiner — Ryan D Howard

(57) ABSTRACT

The method of displaying images on a windscreen of a vehicle with the steps of obtaining, by means of a light sensor unit, at least one physical property of the ambient light incident to the windscreen of the vehicle; generating, by a processor unit, an image to be displayed on the windscreen of the vehicle; based on the determination of at least one physical property of the ambient light incident to the windscreen of the vehicle, adjusting, by means of the processor unit, intensity of each image pixel individually as a function of at least one physical property of the ambient light; and displaying the image by means of a transparent display module integrated into the windscreen of the vehicle.

23 Claims, 5 Drawing Sheets

SYSTEMS AND METHODS FOR DISPLAYING IMAGE ON WINDSCREEN

FIELD OF THE INVENTION

The present invention relates to systems and methods for displaying images on the windscreen of a vehicle. In particular, the present invention relates to systems and methods for displaying images on a vehicle's windscreen by using a transparent display module integrated into the windscreen of the vehicle.

BACKGROUND OF THE INVENTION

Currently, road vehicles are often equipped with a head-up display to assist the driver in various driving conditions through presenting specific information relating to the vehicle or the environment of the vehicle (e.g. road signs, other vehicles or objects in the environment of the vehicle, etc.).

A head-up display (HUD) is a transparent graphical display that presents visual information for a user without requiring the user to look away from his or her usual viewpoint. Today, head-up displays are commonly used in vehicles, where a transparent surface is arranged in front of the driver and the information to be presented is projected to a transparent surface from a projector device through an optical system. Current HUDs can be categorized into two groups: windscreen HUDs and combiner HUDs. The windscreen HUDs use the windscreen of the vehicle as a projection surface, while the combiner HUDs use an additional transparent screen, a so called combiner screen, as the projection surface. Although combiner screen HUDs are more common in road vehicles due to their lower overall costs, they have the particular drawback of the smaller screen size of the projection surface. The smaller projection surface of the combiner screens allows the presentation of smaller text and symbol sizes or less information.

The windscreen HUDs have the drawback that they can produce a spurious image since the projected image appears on the inner side of the windscreen on the one hand, it also appears on the outer side of the windscreen at slightly offset position, on the other hand, due to the thickness of the windscreen. This phenomenon is schematically illustrated in FIG. 1. When a projector device 10 projects an image 12 to the inner surface of a windscreen 20, a major part of the emitted light is reflected from the inner surface of the windscreen 20 and thereby producing a primary (real) view 12 of the image on the windscreen. However, a minor part of the emitted light enters the windscreen and reflected from the outer surface of the windscreen 20, which results in a secondary view 13 of the projected image, called a spurious image. This spurious image may disturb and tire the driver of the vehicle.

A further drawback of the windscreen HUDs is that at daylight, in particular when the sun is directly shining onto the windscreen, the projected image is less or even not at all visible for the driver. This phenomenon is also schematically illustrated in FIG. 1. When the incident light 30 of a high-intensity external illumination source, like the sunshine, reaches the outer surface of the windscreen 20, only a minor portion of the incident light 30 reflects from that surface as a reflected light 31, while a major portion of the incident light 30 traverses through the windscreen 20, thereby making the inner side of the windscreen rather bright. Due to the excessive brightness of the windscreen, the relative intensity of the projected image significantly decreases, which may cause difficulty for the driver in observing the image. Although brightness of the windscreen may be reduced by applying a darkening film on the inner side of the windscreen, the permanent use of such a darkening film is disadvantageous (and dangerous) for driving at nightlight.

A number of documents disclose head-up display systems for vehicles. For example, the document US 2005/0154505 A1 describes a head-up display which uses the entire windshield as a display area. The head-up display system includes a video projector, a screen, a windshield and a Fresnel mirror. The Fresnel mirror magnifies an image from the screen so as to be visually recognized by a driver through his or her eyes.

In view of the above mentioned problems of the currently used HUDs, there is a need for an improved display system and method for displaying images on the windscreen with eliminating the adverse effects of the external light in daylight operation and also to eliminate the adverse optical effects, such as spurious images, of the conventional vehicle windscreen display systems.

SUMMARY OF THE INVENTION

It is therefore an object of the present invention to provide a display system and method for displaying images on a windscreen of a vehicle with adjusting the image pixel intensities individually as a function of one or more physical properties of the ambient light incident to the windscreen of the vehicle.

It is a further object of the present invention to provide a display system and method for vehicles, which uses a transparent display module integrated into the windscreen of the vehicle, wherein the transparent display module comprises transparent pixel units and transparent inter-pixel regions.

These and other objects are achieved by providing a method of displaying images on a windscreen of a vehicle, the method comprising:
  obtaining, by means of a light sensor unit, at least one physical property of the ambient light incident to the windscreen of the vehicle;
  generating, by a processor unit, an image to be displayed on the windscreen of the vehicle;
  based on the determination of said at least one physical property of the ambient light incident to the windscreen of the vehicle, adjusting, by means of the processor unit, intensity of each image pixel individually as a function of said at least one physical property of the ambient light; and
  displaying the image by means of a transparent display module integrated into the windscreen of the vehicle.

The above objects are further achieved by providing a method of displaying images on a windscreen of a vehicle, the method comprising:
  obtaining, by means of a light sensor unit, at least one physical property of the ambient light incident to the windscreen of the vehicle;
  capturing, by means of a first camera device, a first image of the environment in front of the vehicle;
  capturing, by means of a second camera device, a second image of the eyes of a user, in particular the driver of the vehicle;
  based on the second image, determining, by means of the processor unit, the viewing point of a passenger with respect to the windscreen;

mapping, by the processor unit, the first image to at least part of the surface of the windscreen, thereby producing a base image;

analyzing, by the processor unit, the content of the first image;

based on the content of the first image, generating an image object;

fitting, by the processor unit, the image object to the base image;

based on the fitted image object, generating, by the processor unit, a third image to be displayed;

by the processor unit, adjusting intensity of each pixel of said image individually as a function of said at least one physical property of the ambient light incident to the windscreen; and displaying the third image, by means of a transparent display module integrated into the windscreen of the vehicle.

Finally, the above objects are also achieved by providing a system for displaying images on a windscreen of a vehicle, the system comprising:

a light sensor unit for obtaining at least one physical property of the ambient light incident to the windscreen of the vehicle and for providing ambient light information;

a processor unit configured to generate an image to be displayed and further configured to adjust the intensity of each image pixel individually as a function of the ambient light information;

a transparent windscreen display unit for displaying said image on the windscreen of the vehicle, said display unit including two transparent protective layers and a transparent display module therebetween.

BRIEF DESCRIPTION OF THE DRAWINGS

The present invention will now be described in more detail with reference to the drawings, in which.

DETAILED DESCRIPTION OF THE PREFERRED EMBODIMENTS

Figure 1:
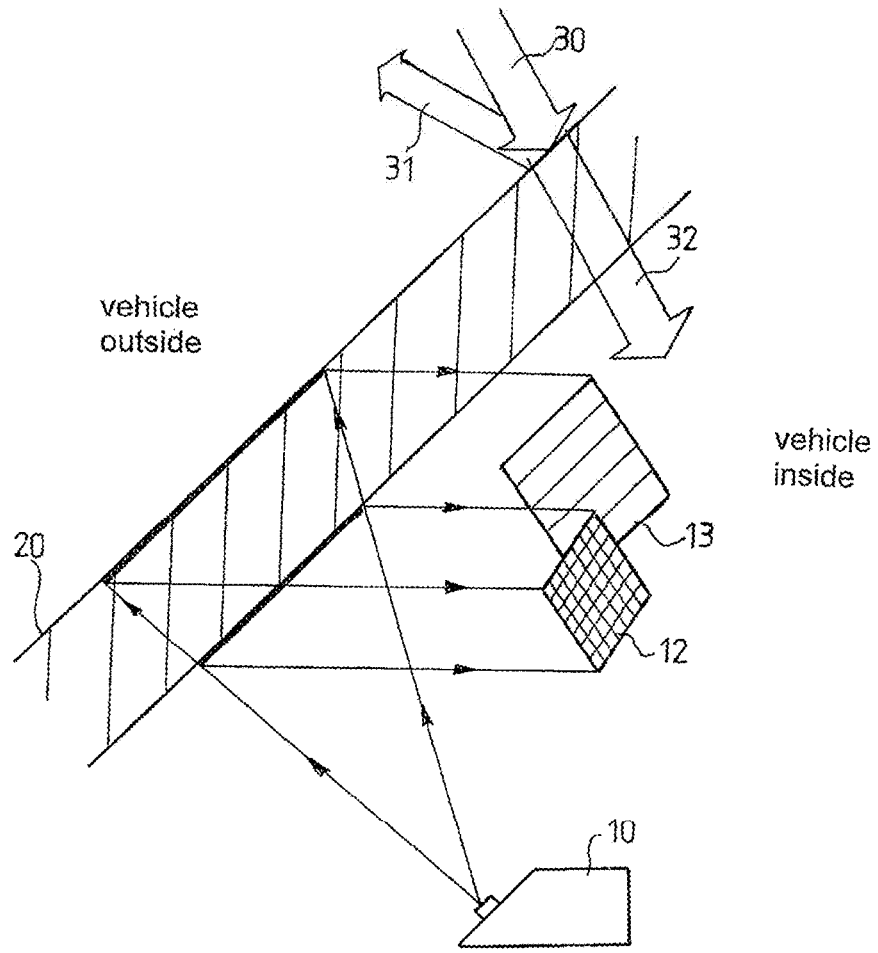
FIG. 1 schematically illustrates unfavorable optical phenomena of prior art windscreen head-up displays.
Figure 2:
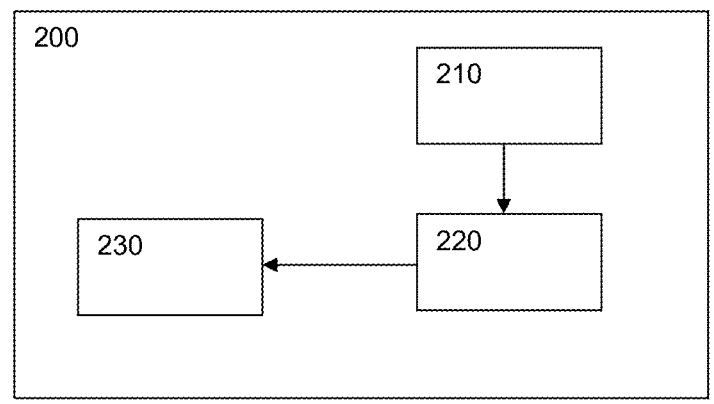
FIG. 2 is a schematic block diagram illustrating the main components of the display system according to the present invention.

The main components of the display system 200 according to the present invention is shown in the schematic block diagram of FIG. 2. Accordingly, the display system 200 comprises a light sensor unit 210 for obtaining at least one physical property of the ambient light incident to the windscreen of the vehicle. In one embodiment of the system, the ambient light sensor unit may comprise one or more photo sensors adapted for measuring an average ambient light intensity. In another embodiment of the system, the light sensor unit may comprise a camera adapted for capturing the environment in front of the vehicle and may further comprise a processor means for processing the captured images and to provide processed information on at least one physical property of the ambient light on the basis of the captured images. The physical properties of the ambient light may include the average ambient light intensity, the light intensity distribution within the captured images of the environment ahead of the vehicle, the color distribution within the captured images of the environment ahead of the vehicle, etc.

The system 200 further comprises a processor unit 220 configured to process the ambient light information received from the light sensor unit 210 and to generate an image to be displayed by a transparent windscreen display unit 230. The image generated by the processor unit 220 may contain one or more image objects, background or the real view of at least a portion of the environment in front of the vehicle.

An image object is the graphical representation of any one or more of operational features of the vehicle, traffic-related features of the vehicle, visible or non-visible objects ahead of the vehicle, etc. For example, an image object may represent the speed of the vehicle, the revolution of the engine of the vehicle, an indication of the dash-board of the vehicle, a traffic sign, a traffic light, any type of navigational object, a view of another vehicle in the environment of the vehicle, any kind of stationary or moving object in the environment of the vehicle (either a partial or entire view, or a contour thereof), a visual effect, a darkening or blanking field, any kind of object invisible for the user (driver or passenger) of the vehicle (either a partial or entire view, or a contour thereof), etc.

The background of the image is defined as the regions of the displayed image containing image pixels other than the image pixels of the at least one image object. Preferably, the background of the image is composed of one or more background objects.

The processor unit 220 is used to adjust the intensity of each image pixel individually as a function of the ambient light information received from the light sensor unit 210 as it will be described in detail later.

The image produced by the processor unit 220 is displayed on a transparent windscreen display unit 230. The transparent windscreen display unit 230 comprises a transparent display module which is integrated into the windscreen of the vehicle. The transparent display module comprises transparent pixel units and transparent inter-pixel regions. The transparent display module may be an LCD display module or a LED display module. In an LCD display module, the intensity of the pixel units is individually adjusted by controlling the amount of backlight passing through the individual pixel units. In a LED display module, the intensity of the pixel units is individually adjusted by controlling the intensity of the LEDs belonging to the individual pixel units.

The intensity and the color of the image pixels forming the image itself is determined by the processor unit 220 based on the content of the image to be displayed and also as a function of one or more physical properties of the ambient light incident to the windscreen.

Figure 3A:
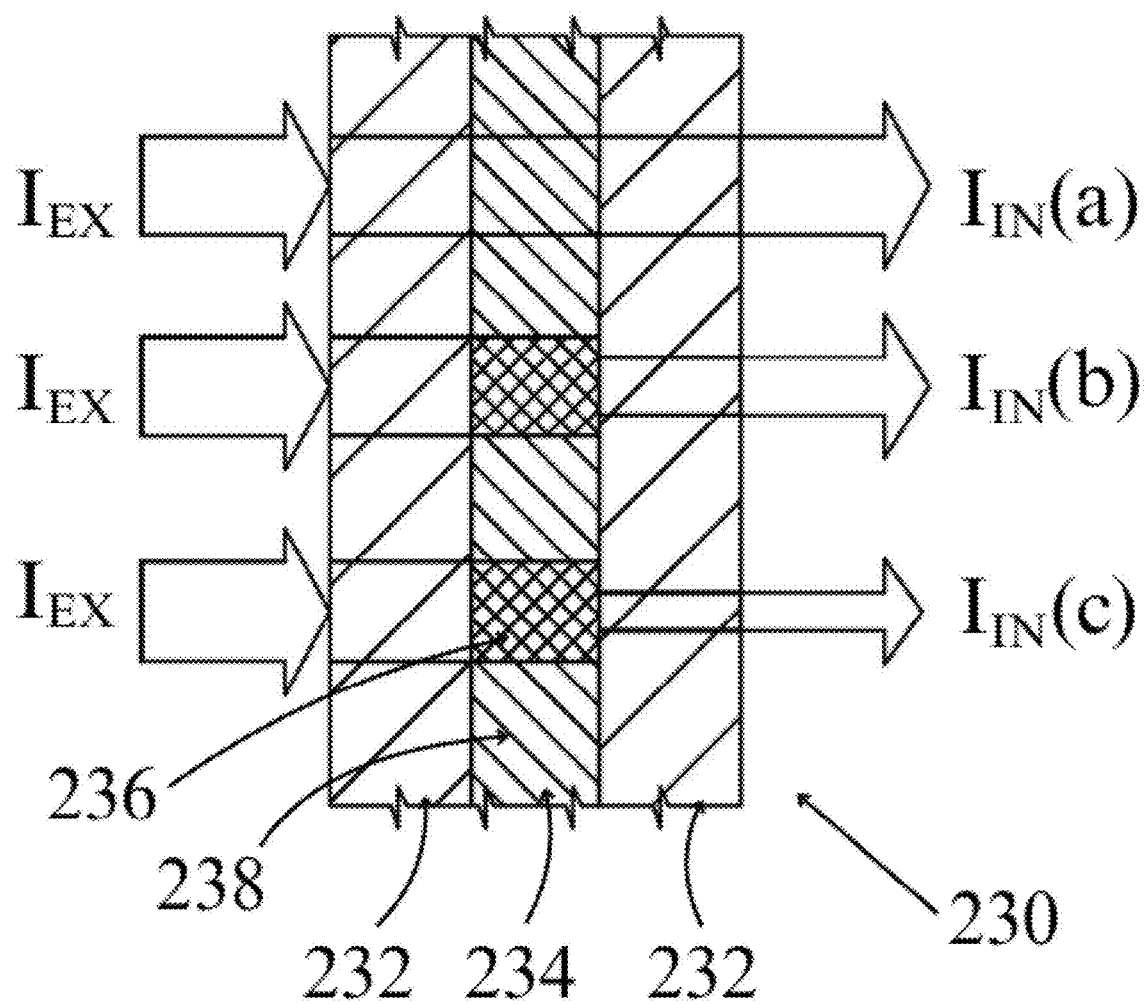
FIG. 3A schematically illustrates the light transmission through a windscreen display of the LCD-type used in the systems and methods according to the present invention.

The light transmission of a transparent windscreen display unit of the LCD type is schematically illustrated in FIG. 3A. This type of windscreen display unit 230 may comprise two transparent protective layers 232 with an LCD display module 234 integrated therebetween. The protective layers 232 are preferably made of glass.

The LCD display module 234 comprises color pixel units 236 and inter-pixel regions 238 between the pixel units 236. Within the context of the present invention, the term "pixel unit" is used for the pixels of the display module (i.e. in terms of hardware), and the term "image pixel" or "pixel" is used for the pixels of an image to be displayed (i.e. in terms of image processing).

As shown in FIG. 3A, the inter-pixel regions 238 allow the incident light to pass through the windscreen display unit 230 without substantial loss (such as reflection or absorption), so the light that has passed through the windscreen display unit 230 has substantially the same intensity $I_{IN}(a)$ as the intensity $I_{EX}$ of the incident light illuminating the windscreen display unit 230 from outside of the vehicle. In this example, the light intensity may be defined as an average light intensity along the overall outer or inner surface of the windscreen. In this example, the ambient light is also used as a backlight of the LCD display module 234.

For the pixels of the image objects and the pixels of the image background, the intensity may be determined differently so that the required level of intensity contrast between the images objects and other parts of the image displayed by the windscreen display unit 230 (further referred to also as "contrast") can be reached at any time irrespective of the physical properties (e.g. average light intensity, light distribution, color distribution, etc.) of the ambient light incident to the windscreen. For example, at daylight more light may be allowed to pass through the windscreen display unit 230 at the pixel units displaying the pixels of an image object, depicted as $I_{IN}(b)$, than at the pixel units displaying the pixels of the image background, depicted as $I_{IN}(c)$, where both of the light intensities $I_{IN}(b)$ and $I_{IN}(c)$ of the pixels of the image objects and the background objects, respectively, may be determined by the processor unit 220 as a function of the ambient light intensity $I_{EX}$. It is also possible that the pixel intensity levels are determined so that the image object pixels are less bright than the background object pixels, for example when the view of a very bright object in the environment of the vehicle is to be darkened or fully blanked by the windscreen display unit 230.

Figure 3B:
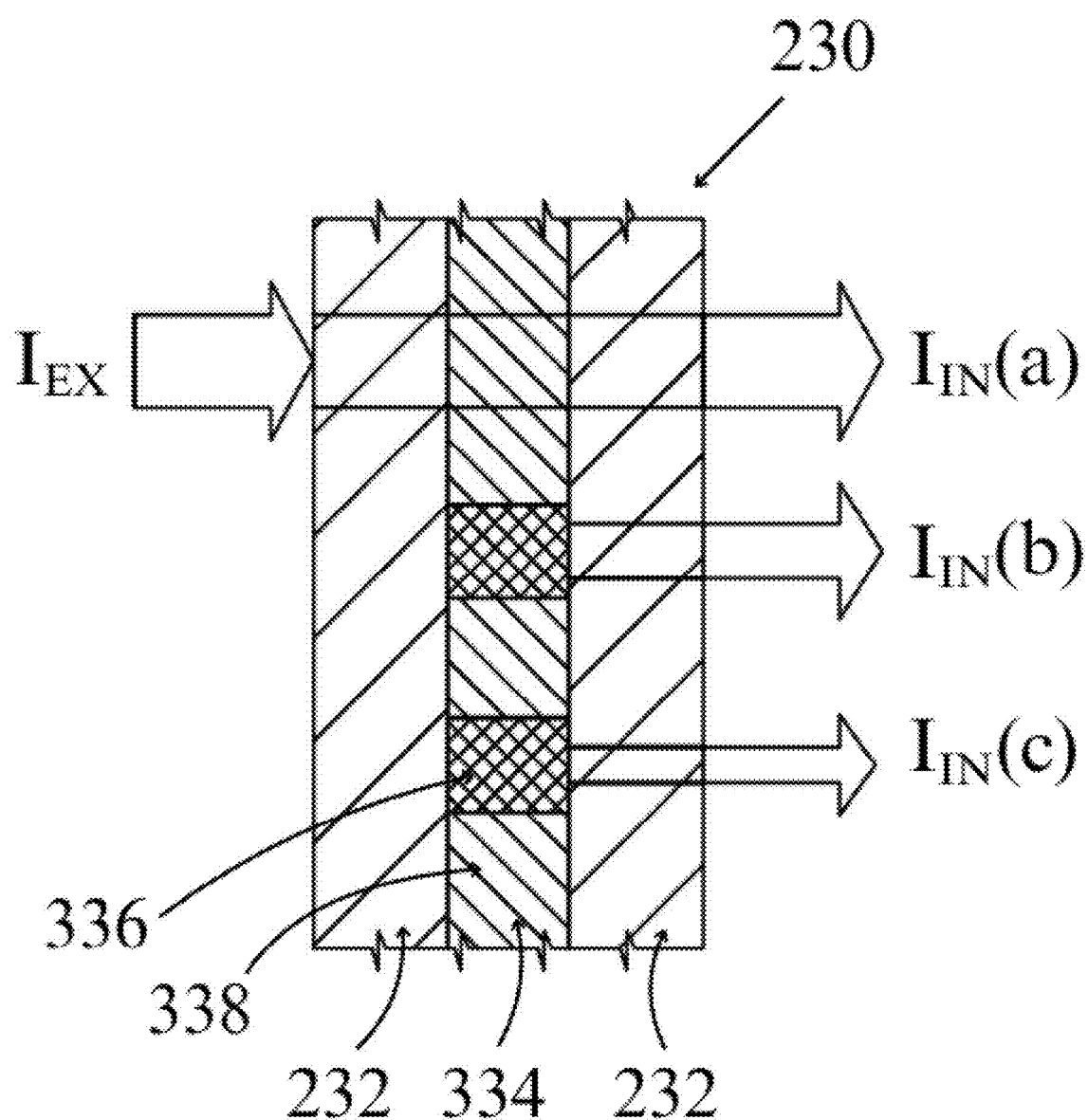
FIG. 3B schematically illustrates the light transmission through a windscreen display of the LED-type used in the systems and methods according to the present invention.

The light transmission of a transparent windscreen display unit of the LED type is schematically illustrated in FIG. 3B. This type of windscreen display unit 230 may comprise two transparent protective layers 232 with an LED display module 334 integrated therebetween. The protective layers 232 are preferably made of glass. The LED display module 334 comprises color pixel units 336 and inter-pixel regions 338 between the pixel units 336.

As shown in FIG. 3B, the inter-pixel regions 338 allow the incident light to pass through the windscreen display unit 230 without substantial loss (such as reflection or absorption), so the light that has passed through the windscreen display unit 230 has substantially the same intensity $I_{IN}(a)$ as the intensity $I_{EX}$ of the ambient light incident to the windscreen. In this example, the light intensity may be defined as an average light intensity along the overall outer or inner surface of the windscreen. With a LED display module 334, the majority of the ambient light passes through the transparent inter-pixel regions 338.

For the pixels of the image objects and the pixels of the background objects, the intensity may be determined differently so that the required level of contrast between the image objects and other parts of the image displayed by the windscreen display unit 230 can be reached at any time irrespective of the physical properties (e.g. average light intensity, light distribution, color distribution, etc.) of the ambient light incident to the windscreen. For example, at daylight the LEDs of the pixel units displaying an image object, depicted as $I_{IN}(b)$, are set to have higher intensity than the pixel units displaying a background object, depicted as $I_{IN}(c)$, where both of the light intensities $I_{IN}(b)$ and $I_{IN}(c)$ of the image object pixels and the background object pixels, respectively, are determined by the processor unit 220 as a function of the incident ambient light intensity $I_{EX}$. It is also possible that the pixel intensity levels are determined so that the image object pixels are less bright than the background object pixels, for example when the view of a very bright object in the environment of the vehicle is to be darkened or fully blanked by the windscreen display unit 230.

It is noted that the transparency of the inter-pixel regions is normally much higher than that of the pixel units of the transparent display module. It is particularly preferred that the transparency of the inter-pixel regions is approximately (or exactly) the same as the transparency of the protective glass layers of the windscreen. Due to the electronic components involved in the pixel units of a transparent display module, the transparency of the pixel units of the display module is less, or sometimes significantly less than that of the inter-pixel regions. Furthermore, in case of the display modules of the LCD type, the transparency of the pixel units may even be changed (e.g. increased or decreased) through electronically adjusting the light intensities of the pixel units according to the image to be displayed. Unlike an LCD-type transparent display module, the transparency of the pixel units of a LED-type display module is approximately constant and the pixel intensities are adjusted by the intensity of the built-in light sources, i.e. LEDs, of the pixel units on the basis of the image to be displayed. In either case, however, the overall transparency of the windscreen display unit depends on the transparency of the inter-pixel regions and the (steady or adjustable) transparency of the pixel units of the transparent display module. For road vehicles, such as cars, trucks, etc., the minimum transparency of a windscreen is set about 60-70% because of traffic safety regulations, which means that the transparent display module used in the display system of the present invention should also meet this requirement.

Figure 4:
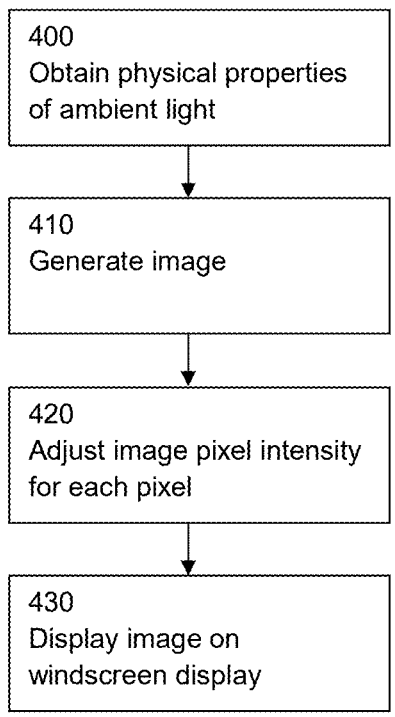
FIG. 4 is a flow diagram showing the main steps of a first method of the invention.

The methods of displaying images by means of the above introduced display system will now be described in detail with reference to FIG. 4.

As a first step 400 of the first method according to the present invention, at least one physical property of the ambient light incident to the windscreen of the vehicle is obtained by means of a light sensor unit, such as a photo detector, a radar detector, an ultrasonic detector, a camera device, or the like.

As mentioned above, the physical properties of the incident ambient light may include the average ambient light intensity in the environment of the vehicle, the light intensity distribution within the images captured by a camera, the color distribution within the images captured by a camera, etc.

Next, in step 410, an image to be displayed on the windscreen of the vehicle is generated by a processor unit. The content of the image may include one or more image objects and one or more background objects. An image object is a visual (or graphical) representation of any one or more of the following items: operational features of the vehicle, traffic-related features of the vehicle, visible or non-visible objects ahead of the vehicle, etc. Several examples of the image object have been mentioned above. A background object is defined as any kind of image content that cannot be regarded as an image object, i.e. image content not carrying information relating to the vehicle or its environment. The background objects include regions of the displayed image containing the image pixels other than the image pixels of the at least one image object. The background objects may typically include a plain color field, a color transition field, a textured field, etc.

Based on the determination of said at least one physical property of the ambient light incident to the windscreen of the vehicle, the intensity of the pixels within an image is individually adjusted, in step 420, by means of the processor unit for each image pixel as a function of said at least one physical property of the ambient light incident to the windscreen.

The information obtained by the at least one sensor device and/or measuring device is processed by the processor unit to generate an image to be displayed on the windscreen. As mentioned above, the generated image may contain one or more image objects representing the detected or measured information in a graphical form, as well as a graphical (or real view) representation of a part of the environment ahead of the vehicle, and one or more background objects used to tune the contrast of the image objects under various ambient light conditions.

In one embodiment of the method, the intensity of the image object pixels and the intensity of the background object pixels are determined so that an average intensity of the background objects and the inter-pixel regions surrounding an image object provide a required level of intensity contrast C for the image object with respect to the background objects and the inter-pixel regions. Accordingly, the contrast C of an image object may be expressed by the following equation (using the notations of FIGS. 3A and 3B):

$$C = \frac{I_{IN}(b)}{I_{IN}(a) + I_{IN}(c)}$$

where $I_{IN}(b)$ is the average pixel intensity of the pixels of the image object, $I_{IN}(c)$ is the average pixel intensity of the pixels of the background object(s) surrounding the image object, and $I_{IN}(a)$ is the average light intensity of the inter-pixel regions surrounding the image object.

It is preferred that the image to be displayed on the windscreen of the vehicle is generated so that the contrast C of any image object within the image is at least 500:1, preferably at least 1000:1. With these ranges of the contrast C, the image objects can be clearly recognized on the windscreen by the viewing user, such as the driver of the vehicle.

It should be noted that the light intensity of the inter-pixel units, as perceived by a user (e.g. the driver) may depend on the period of the day (e.g. daytime, nighttime, twilight, dawn), on the weather (e.g. sunny, cloudy, rainy, foggy, etc.) and on the particular optical properties of the environment where the vehicle is currently moving or staying (e.g. reflecting or bright objects, shadows, tunnels, etc.).

In order to maintain the required level of contrast for the image objects, various adjustments of the pixel intensities of the image may be applied as indicated, as an example, in Table 1 below.

TABLE 1

| Case No. | Description of the environment | Intensity of incident light ($I_{IN}(a)$) | Intensity of image object pixels (to be set) ($I_{IN}(b)$) | Intensity of background object pixels (to be set) ($I_{IN}(c)$) |
|---|---|---|---|---|
| 1 | daylight, sunny | high | high | medium or low |
| 2 | daylight, cloudy | medium | high or medium | medium or low |
| 3 | nightlight, streets | low | medium or low | low |
| 4 | nightlight, county roads without on-coming traffic | approx. zero | low | low |
| 5 | nightlight, county roads with on-coming traffic | medium | zero | low |

In the cases No. 1-3, the contrast of the image objects is tuned so that the most appropriate intensity of the useful information is achieved on the windscreen for the viewing person. Under the most appropriate intensity it is hereby meant that the image object is displayed in a clearly recognizable form while the presentation of the entire image on the windscreen allows the driver to securely drive the vehicle.

In the case No. 4, the displayed image is tuned to be adopted to nightlight conditions when the vehicle is travelling on a country road when there is no or hardly any on-coming traffic. In this situation, the image objects are presented only at a low intensity thus providing a so-called "looming" display mode. In this case, for an LCD-type transparent display module, it may be necessary to use an additional light source, for example an illumination unit integrated into the periphery of the LCD-type display module, for generating the required level of backlight to display the image objects. Obviously, there is no need of such additional illumination for a LED-type transparent display module.

In the case No. 5, darkening image objects may be displayed on the windscreen of the vehicle to darken (or to fully blank) those fields of the windscreen where the user (driver or passenger) can perceive disturbing high intensity of the light radiated by another on-coming vehicle. The image pixels of such a darkening image object are set to have zero intensity within the displayed image.

Finally, in step 430, the image is displayed on the windscreen of the vehicle by means of a transparent display module integrated into the windscreen of the vehicle, wherein the transparent display module comprises transparent pixel units and transparent inter-pixel regions.

In one embodiment of the method, one or more sensor devices and/or measuring devices may be used to obtain information about at least one physical property of the vehicle and/or the outer environment of the vehicle. The sensor device may include, for example, photo detector, radar detector, ultrasonic detector, camera device, GPS position sensor, etc. The measuring device may be, for example, speedometer, tachometer, thermometer, etc. In this embodiment, the processor unit further uses the sensor data and/or measurement data of the at least one sensor device or measuring device for generating the image to be displayed on the windscreen of the vehicle through the integrated transparent display module.

In one embodiment of the method, an LCD-type display module is used as a transparent display module. In this embodiment, either the ambient light is used as backlight of the display module, or a light source (e.g. LED unit)

integrated into the periphery of the display module is used for generating backlight for the display module, or both the ambient light and the integrated light source may be simultaneously used for providing backlight for the LCD-type display module.

Alternatively, in another embodiment of the method, a LED-type display module is used as a transparent display module. In this embodiment, there is no need of backlight for operating display since the LED light sources of the display pixel units themselves produce the light for displaying the image.

It is preferred that the image is displayed as a motion picture. In particular, one or more image objects may be displayed as a motion picture, i.e. the content of the image objects may vary along time. For example, an image object may present a graphical representation of the speedometer with indicating the speed of the vehicle, or a navigation screen may be displayed with showing a road map and other navigation information.

When an image object is presented as a motion picture, it is particularly preferred that the image object is displayed in real time in response to the changes of the sensed or measured physical property or environmental information relating to the vehicle. For example, an image object that shows the speedometer may be displayed to show the instantaneous speed of the vehicle, or a navigation screen may be displayed with continuously updating the road map and other navigation information in real time.

In a preferred embodiment of the system and the method of the invention, augmented reality may be displayed on the windscreen of the vehicle. An augmented reality (AR) image may be generated using a specific embodiment of the display system according to the invention, which will be described below with reference to FIG. 5 depicting the main components of this embodiment of the display system.

Figure 5:
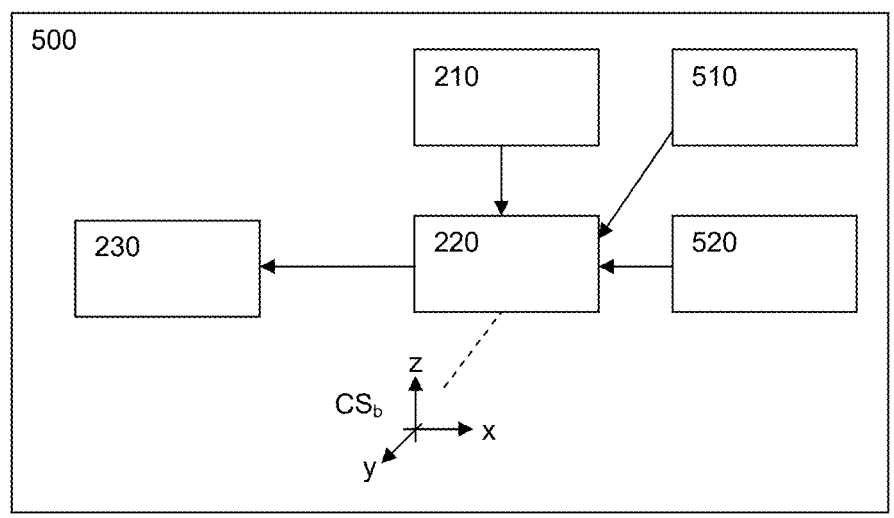
FIG. 5 depicts the main components of a specific embodiment of the display system according to the invention, which can be used for presenting augmented reality.

As shown in FIG. 5, the system 500 comprises a first camera device 510 for capturing images of the environment in front of the vehicle. The viewing angle and other optical parameters (e.g. focal length, resolution, etc.) of the first camera device 510 may depend on the location of the first camera device 510 with respect to the vehicle. The image quality of the first camera device 500 may, for example, depend on the filters used in front of the lenses (e.g. UV filter, anti-glare coating, etc.), the material quality of the glass and the coatings, etc. The first camera device 510 may include a conventional video camera, an infra camera, an ultraviolet (UV) camera, a radar camera, or the like.

The system 500 further comprises a second camera device 520 for capturing images of the eyes of a user in the vehicle (e.g. driver or passenger). The first and second camera devices 510, 520 are also coupled to the processor unit 220 (shown in FIG. 2), which is now further configured to process the image of the second camera device 520 for determining the three-dimensional position of the eyes of the user in a predetermined base coordinate system $CS_b$.

In the system 500, the position and the orientation of the second camera device 520 may be fixed relative to the base coordinate system $CS_b$, and also the three-dimensional surface of the windscreen, more particularly the integrated display module, is mapped into the base coordinate system $CS_b$ so that the processor unit 220 can determine, based on the images of the second camera device 520, the relative position of the eyes of the user with respect to the windscreen. Additionally, the viewing direction of the user may also be determined by the processor unit 220 on the basis of the image captured by the second camera device. Based on these parameters, the processor unit 220 is capable of reconstructing the field of view observable for the user through the windscreen of the vehicle. Once this field of view has been determined, the processor unit 220 can map the objects within the field of view onto the three-dimensional surface of the windscreen, or into at least a part thereof in front of the user (driver or passenger). As a result, the mapped view of the environment as can be seen by the user (driver or passenger) through the windscreen will serve as a base image for fitting any image object to a particular part of the base image.

In this embodiment, the processor unit 220 is further configured to fit an image object to the base image so that the user (driver or passenger) can see the associated image object on the windscreen as it would be a part of the environment of the vehicle. The techniques of generating such an AR image object is well known in the art, therefore its computational details are omitted herein. It is also noted that in this embodiment of the system, it is not necessary to display the base image itself since the base image, i.e. the view of the environment in front of the vehicle, can be seen through the transparent windscreen of the vehicle. However, it is also feasible that at least a part of the base image, which is based on the image captured by the first camera device, is also displayed by the windscreen display unit, preferably at a lower intensity that the AR image object.

The light sensor unit 210 and the transparent windscreen display unit 230 of the system 500 are the same as described above with reference to FIG. 2.

The AR images are preferably presented in real time in response to changes in the position of the vehicle with respect to its environment while travelling.

Figure 6:
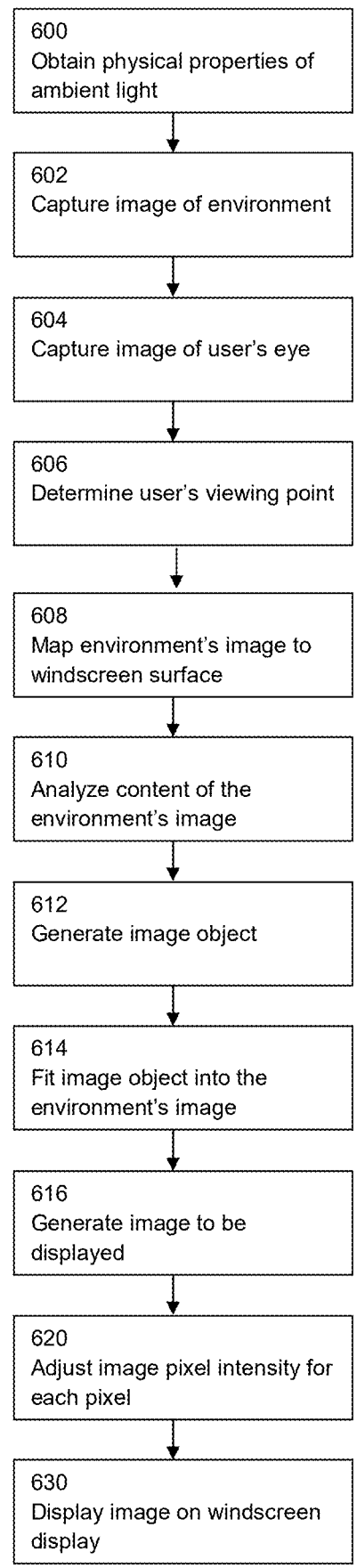
FIG. 6 is a flow diagram showing the main steps of a second method according to the present invention.

A second method according to the invention ++using the above described display system will be introduced below with reference to FIG. 6.

As a first step 600 of the method, at least one physical property of the ambient light incident to the windscreen of the vehicle is obtained by means of a light sensor unit. This step corresponds to step 400 of the method described above with reference to FIG. 4.

In step 602, a first image is captured of the environment in front of the vehicle by means of a first camera device.

Next, in step 604, a second image is captured of the eyes of the user (e.g. driver or passenger) by means of a second camera device. Based on the second captured image, the viewing point of the user and optionally, also the viewing direction of the user, with respect to the windscreen is determined in step 606 by means of the processor unit.

In step 608, the first image captured of the environment by means of the first camera device is then mapped to the three-dimensional surface of the windscreen, or to at least a part thereof close to the user (driver or passenger). The windscreen surface may be defined in a predetermined base coordinate system of the display system. The first image of the environment mapped to the surface of the windscreen will serve as a base image for the subsequent image processing.

In a next step 610, the environment's first image captured by the first camera device is processed for analyzing its content. Then in step 612, at least one image object is generated on the basis of the content of the environment's first image, where the at least one image object is to be added to the base image for producing an augmenting reality image, i.e. a third image, on the windscreen. For example, an image object may include a segment of the lane ahead of the car, any object of the traffic around the vehicle, like a pedestrian, another vehicle, a junction, etc.

The at least one image object associated with the base image is then fitted to the base image by the processor unit in step 614 so that the user (driver or passenger) can perceive the at least one image object on the windscreen as it would be a part of the environment in front of the vehicle. For fitting the at least image object to the base image, the position of the eyes of the user, which has been previously determined in step 606, is used by the processor unit.

Then in step 616, a third image to be displayed is generated by the processor unit based on the at least one image object fitted into the base image. The generated third image contains the one or more fitted image objects and one or more background objects.

In step 620, the intensity of the image pixels is individually determined by means of the processor unit as a function of the at least one physical property of the ambient light incident to the windscreen. This step is carried out in the same way as step 420 above. The physical properties of the incident ambient light may include at least one of the average ambient light intensity in the environment of the vehicle, the light intensity distribution within the images captured by a camera, the color distribution within the images captured by a camera.

Finally, in step 630, the third image is displayed on the windscreen by means of the transparent display module without displaying the base image. Together with the at least one image object, at least one background object may also be generated and displayed on the transparent display module in a manner that the contrast of the at least one image object is in the required range. By displaying the at least one image object on the windscreen in a position that is fitted to the view of the environment as perceived by the user (e.g. driver or passenger), an augmented reality can be presented by means of the transparent windscreen display unit of the vehicle.

In a particularly preferred embodiment of the display method, the third image containing the fitted image object(s) and the background object(s) is a motion picture, in which the graphic representation of the fitted image object(s) always follow the changes of the user's view of the environment in real time while the vehicle is travelling.

An image object of the second method may be a graphical representation of at least one of operational features of the vehicle, traffic-related features of the vehicle, visible or non-visible objects ahead of the vehicle. The background object may include at least one of a plain color field, a color transition field, a textured field, or the like.

In the second method, the intensity of the image object pixels and the intensity of the background object pixels are set so that an average intensity of the background objects and the inter-pixel regions surrounding the image object provides a preset level of contrast for the image object with respect to the background objects and the inter-pixel regions of the transparent display unit. Preferably, the contrast is set to be at least 500:1, more preferably at least 1000:1.

In one embodiment of the display system according to the invention, the transparent display module may be integrated into a substantial part of the windscreen of the vehicle, so the driver and other passengers of the vehicle can use the windscreen display unit at the same time. In this case, at least a part of the transparent windscreen display unit may be bent along one or two directions. Accordingly, the integrated transparent display module may be shaped to fit to the three-dimensional surface of the windscreen.

When the transparent display module has a curved portion, which is bent along one or two directions, those part of the image that are to be presented on a curved portion of the display module, should be distorted appropriately so that the user (driver or passenger) can perceive the image appearing on the curved part of the windscreen without distortion. The required image transformation, which is carried out by the processor unit, is well known in the art, therefore its details are omitted herein.

In one embodiment of the display method according to the invention, at least one of the following display properties of the transparent display module may be optimized by the processor unit: transparency, saturation, contrast, colour balance, etc.

The invention claimed is:

1. A method of displaying images on a windscreen of a vehicle, comprising:
   obtaining (600), by means of a light sensor unit, at least one physical property of the ambient light incident to the windscreen of the vehicle;
   capturing (602), by means of a first camera device, a first image of the environment in front of the vehicle;
   capturing (604), by means of a second camera device, a second image of the eyes of a user within the vehicle;
   based on the second image, determining (606), by means of a processor unit, the viewing point of said user with respect to the windscreen;
   mapping (608), by the processor unit, the first image to at least part of the surface of the windscreen, thereby producing a base image;
   analyzing (610), by the processor unit, the content of the first image;
   based on the content of the first image, generating (612) at least one image object;
   fitting (614), by the processor unit, the at least one image object to the base image;
   based on the fitted at least one image object, generating (616), by the processor unit, a third image to be displayed;
   by the processor unit, adjusting (620) intensity of each pixel of said third image individually as a function of said at least one physical property of the ambient light incident to the windscreen;
   displaying (630) the third image, by means of a transparent display module integrated into the windscreen of the vehicle.

2. The method of claim 1, wherein the light sensor unit includes at least one of: a photo detector or a camera device.

3. The method of claim 1, wherein the physical properties of the incident ambient light include at least one of: the average ambient light intensity in the environment of the vehicle, the light intensity distribution within the images captured by a camera, the color distribution within the images captured by a camera.

4. The method of claim 1, wherein the third image includes one or more background objects.

5. The method of claim 1, wherein an image object is a graphical representation of at least one of: operational features of the vehicle, traffic-related features of the vehicle, visible or non-visible objects ahead of the vehicle.

6. The method of claim 4, wherein the background object includes at least one of: a plain color field, a color transition field, or a textured field.

7. The method of claim 4, wherein the intensity of the image object pixels and the intensity of the background object pixels are set so that an average intensity of the background objects and the inter-pixel regions surrounding the image object provides a preset level of contrast for the image object with respect to the background objects and the inter-pixel regions of the transparent display unit.

8. The method of claim 7, wherein the contrast is set to be at least 500:1, preferably at least 1000:1.

9. The method of claim 1, further comprising the steps of:
by means of at least one sensor devices or measuring device, obtaining information about least one physical property of the vehicle and/or the outer environment of the vehicle;
by the processor unit, generating an image object representing the obtained information;
by the transparent display module, displaying an image containing said image object.

10. The method of claim 9, wherein
the sensor device includes at least one of: a photo detector, a radar detector, an ultrasonic detector, a camera device, a GPS position sensor; and
the measuring device includes at least one of: a speedometer, a tachometer, a thermometer.

11. A system for displaying images on a windscreen of a vehicle for carrying out the method according to claim 1, the system comprising:
the light sensor unit (210) for obtaining at least one physical property of the ambient light incident to the windscreen of the vehicle and for providing ambient light information;
the processor unit (220) configured to generate an image to be displayed and further configured to adjust the intensity of each image pixel individually as a function of the ambient light information;
a transparent windscreen display unit (230) for displaying said image on the windscreen of the vehicle, said display unit including two transparent protective layers and the transparent display module therebetween.

12. The system of claim 11, wherein the transparent display module is one of an LCD-type display module (234) and a LED-type display module (334).

13. The system of claim 12, wherein a light source is integrated into the periphery of the LCD-type display module (234).

14. The system of claim 11, wherein the transparent windscreen display unit (230) is bent along one or two directions.

15. The method of claim 1, wherein
the transparent display module comprises at least one curved portion bent along one or two directions, and
the step of displaying the third image comprises displaying a part of the third image on a curved portion of the transparent windscreen display unit in a distorted form so that the user can perceive said part of the third image without distortion.

16. A method of displaying images on a windscreen of a vehicle, comprising:
obtaining (400), by means of a light sensor unit, at least one physical property of the ambient light incident to the windscreen of the vehicle;
generating (410), by a processor unit, an image to be displayed on the windscreen of the vehicle;
based on the determination of said at least one physical property of the ambient light incident to the windscreen of the vehicle, adjusting (420), by means of the processor unit, intensity of each image pixel individually as a function of said at least one physical property of the ambient light;
displaying (430) the image by means of a transparent display module integrated into the windscreen of the vehicle,
wherein the image comprises at least one image object and at least one background object represented by a plurality of pixels of the image,
wherein the transparent display module comprises a plurality of pixel units and a plurality of inter-pixel regions between the pixel units, and
wherein the intensity of the pixels of the at least one image object and the intensity of the pixels of the background object are set so that an average intensity of the background objects and the inter-pixel regions surrounding the at least one image object provides a preset level of contrast for the at least one image object with respect to the at least one background object and to the inter-pixel regions of the transparent display unit.

17. The method of claim 16, wherein the light sensor unit includes at least one of: a photo detector or a camera device.

18. The method of claim 16, wherein the physical properties of the incident ambient light include at least one of: the average ambient light intensity in the environment of the vehicle, the light intensity distribution within the images captured by a camera, the color distribution within the images captured by a camera.

19. The method of claim 16, wherein the image object is a graphical representation of at least one of: operational features of the vehicle, traffic-related features of the vehicle, visible or non-visible objects ahead of the vehicle.

20. The method of claim 16, wherein the background object includes at least one of: a plain color field, a color transition field, or a textured field.

21. The method of claim 11, wherein the contrast is set to be at least 500:1, preferably at least 1000:1.

22. The method of claim 16, further comprising the steps of:
by means of at least one sensor devices or measuring device, obtaining information about least one physical property of the vehicle and/or the outer environment of the vehicle;
by the processor unit, generating an image object representing the obtained information;
by the transparent display module, displaying an image containing said image object.

23. The method of claim 22, wherein
the sensor device includes at least one of: a photo detector, a radar detector, an ultrasonic detector, a camera device, a GPS position sensor; and
the measuring device includes at least one of: a speedometer, a tachometer, a thermometer.

* * * * *